United States Patent
Yoon (10) Patent No.: US 12,087,919 B2
(45) Date of Patent: Sep. 10, 2024

(54) BATTERY BALANCING APPARATUS AND BATTERY PACK INCLUDING THE SAME

(71) Applicant: LG CHEM, LTD., Seoul (KR)

(72) Inventor: Ho-Byung Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 936 days.

(21) Appl. No.: 17/054,219

(22) PCT Filed: Dec. 19, 2019

(86) PCT No.: PCT/KR2019/018143
§ 371 (c)(1),
(2) Date: Nov. 10, 2020

(87) PCT Pub. No.: WO2020/141772
PCT Pub. Date: Jul. 9, 2020

(65) Prior Publication Data
US 2021/0075067 A1 Mar. 11, 2021

(30) Foreign Application Priority Data
Jan. 3, 2019 (KR) ........................ 10-2019-0000896

(51) Int. Cl.
*H01M 10/42* (2006.01)
*H02J 7/00* (2006.01)

(52) U.S. Cl.
CPC ....... *H01M 10/4257* (2013.01); *H02J 7/0019* (2013.01); *H02J 7/0024* (2013.01); *H01M 2010/4271* (2013.01)

(58) Field of Classification Search
CPC ....... H01M 10/4257; H01M 2010/4271; H02J 7/0019; H02J 7/0024
See application file for complete search history.

(56) References Cited

U.S. PATENT DOCUMENTS

2007/0046260 A1* 3/2007 Ishikawa ............... H02J 7/0016
320/135
2008/0094042 A1 4/2008 Ferrario
(Continued)

FOREIGN PATENT DOCUMENTS

CN 103166272 A 6/2013
CN 106921182 A 7/2017
(Continued)

OTHER PUBLICATIONS

Koo et al., KR 1020140135427 Espacenet machine translation, 2014 (Year: 2014).*

(Continued)

*Primary Examiner* — Adam A Arciero
(74) *Attorney, Agent, or Firm* — Birch, Stewart, Kolasch & Birch, LLP (57) ABSTRACT

A battery balancing apparatus according to an embodiment of the present disclosure includes a first selection unit to selectively connect each of a plurality of batteries included in a first battery group between a first node and a second node, a resistance adjustment unit to connect a first resistor, a second resistor, a series circuit of the first and second resistors or a parallel circuit of the first and second resistors between the first node and the second node, and a control unit. The control unit determines at least one of the batteries as a first balancing target based on a first voltage signal indicating voltage of each battery. The first selection unit connects the first balancing target between the first node and the second node. The control unit controls the resistance adjustment unit based on a voltage difference between voltage of the first balancing target and a reference voltage.

16 Claims, 6 Drawing Sheets

(56) References Cited

U.S. PATENT DOCUMENTS

| | | |
|---|---|---|
| 2008/0258683 A1 | 10/2008 | Chang |
| 2009/0009133 A1 | 1/2009 | Tange et al. |
| 2010/0194339 A1 | 8/2010 | Yang et al. |
| 2011/0003182 A1 | 1/2011 | Zhu |
| 2013/0057224 A1 | 3/2013 | Choi et al. |
| 2013/0278218 A1 | 10/2013 | Onnerud et al. |
| 2014/0340022 A1 | 11/2014 | Kang et al. |
| 2018/0269694 A1 | 9/2018 | Nam et al. |

FOREIGN PATENT DOCUMENTS

| | | |
|---|---|---|
| DE | 10 2011 100 151 A1 | 10/2012 |
| JP | 2005-184898 A | 7/2005 |
| JP | 2005-341645 A | 12/2005 |
| JP | 2008-21589 A | 1/2008 |
| JP | 2010-183831 A | 8/2010 |
| JP | 2012-217276 A | 11/2012 |
| JP | 2013-50312 A | 3/2013 |
| JP | 5509856 B2 | 6/2014 |
| JP | 2018-529304 A | 10/2018 |
| KR | 10-1997-0024437 A | 5/1997 |
| KR | 10-2010-0040804 A | 4/2010 |
| KR | 10-2011-0004245 A | 1/2011 |
| KR | 10-2013-0025561 A | 3/2013 |
| KR | 10-2014-0135427 A | 11/2014 |
| KR | 10-2015-0089627 A | 8/2015 |
| KR | 10-2017-0071949 A | 8/2017 |

OTHER PUBLICATIONS

International Search Report (PCT/ISA/210) issued in PCT/KR2019/018143 mailed on Apr. 3, 2020.

Extended European Search Report for European Application No. 19907938.5, dated Sep. 6, 2021.

* cited by examiner

BATTERY BALANCING APPARATUS AND BATTERY PACK INCLUDING THE SAME

TECHNICAL FIELD

The present disclosure relates to state of charge (SOC) balancing of a plurality of batteries.

The present application claims priority to Korean Patent Application No. 10-2019-0000896 filed in the Republic of Korea on Jan. 3, 2019, the disclosure of which is incorporated herein by reference.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

More recently, as electric vehicles require high output, a battery pack mounted on an electric vehicle generally includes a plurality of battery modules, each battery module including a plurality of batteries connected in series. However, as the battery pack is repeatedly charged and discharged, the state of charge (SOC) imbalance between the batteries occurs unavoidably. When the repeated charge and discharge of the battery pack continues without solving the imbalance, the battery pack reduces in reversible capacity and degradation of the batteries included in the battery pack is accelerated.

To solve the above-described problem, Patent Literature 1 forcibly discharges batteries having higher SOC to balance the SOC of the batteries. However, as shown in FIG. 2 of Patent Literature 1, a balancing circuit including the same number of resistors as the plurality of batteries is essentially required. Accordingly, the entire battery pack is large in size. In addition, it is desirable to add a heat dissipation structure into the battery pack to prevent the drastic emission of a lot of heat when simultaneously balancing the plurality of batteries, but there is a space limitation.

(Patent Literature 1) Korean Patent Publication No. 10-2015-0089627 (published on Aug. 5, 2015)

DISCLOSURE

Technical Problem

The present disclosure is designed to solve the above-described problem, and therefore the present disclosure is directed to providing a battery balancing apparatus capable of selectively discharging each of batteries mounted in a battery pack using a smaller number of resistors than the number of the batteries, and a battery pack including the same.

The present disclosure is further directed to providing a battery balancing apparatus in which a resistor, a series circuit of two resistors or a parallel circuit of two resistors is connected in parallel to a balancing target depending on the voltage of each battery determined as the balancing target, and a battery pack including the same.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

A battery balancing apparatus according to an aspect of the present disclosure includes a detector configured to output a first voltage signal indicating voltage of each of a plurality of batteries included in a first battery group, a first selector configured to selectively electrically connect each of the plurality of batteries included in the first battery group between a first node and a second node, a resistance adjuster configured to selectively electrically connect a first resistor, a second resistor, a series circuit of the first resistor and the second resistor or a parallel circuit of the first resistor and the second resistor between the first node and the second node, and a controller operably coupled to the detector, the first selector and the resistance adjuster. The controller is configured to determine at least one of the plurality of batteries included in the first battery group as a first balancing target based on the first voltage signal. The first selector is configured to electrically connect the first balancing target between the first node and the second node. The controller is configured to control the resistance adjuster based on a first voltage difference between a voltage of the first balancing target and a reference voltage.

A first end of the first resistor may be electrically connected to the first node. One end of the second resistor may be electrically connected to the second node. The resistance adjuster may include a first switch connected between a second end of the first resistor and the second node, and a second switch connected between a second end of the second resistor and the first node.

A resistance of the first resistor may be higher than a resistance of the second resistor. The controller may be configured to turn on the first switch and turn off the second switch so that the first resistor is electrically connected between the first node and the second node, when the first voltage difference is equal to or larger than a first threshold voltage and smaller than a second threshold voltage.

A resistance of the first resistor may be higher than a resistance of the second resistor. The controller may be configured to turn off the first switch and turn on the second switch so that the second resistor is electrically connected between the first node and the second node, when the first voltage difference is equal to or larger than the second threshold voltage and smaller than a third threshold voltage.

The controller may be configured to turn on the first switch and the second switch so that the parallel circuit is electrically connected between the first node and the second node, when the first voltage difference is equal to or larger than the third threshold voltage.

The resistance adjuster may further include a third switch connected between the second end of the first resistor and the second end of the second resistor. The controller may be configured to turn off the first switch and the second switch and turn on the third switch so that the series circuit is electrically connected between the first node and the second node, when the first voltage difference is smaller than the first threshold voltage.

A first end of the first resistor may be electrically connected to the first node. The resistance adjuster may include a first switch connected between a second end of the first resistor and the second node, a second switch connected between a first end of the second resistor and the second node, and a third switch connected a second end of the second resistor and the first node.

A resistance of the first resistor may be higher than a resistance of the second resistor. The controller may be configured to turn on the first switch and turn off at least one of the second switch and the third switch so that the first resistor is electrically connected between the first node and the second node, when the first voltage difference is equal to or larger than a first threshold voltage and smaller than a second threshold voltage.

The resistance of the first resistor may be higher than the resistance of the second resistor. The controller may be configured to turn on the second switch and the third switch and turn off the first switch so that the second resistor is electrically connected between the first node and the second node, when the first voltage difference is equal to or larger than the second threshold voltage and smaller than a third threshold voltage.

The controller may be configured to turn on the first switch, the second switch and the third switch so that the parallel circuit is electrically connected between the first node and the second node, when the first voltage difference is equal to or larger than the third threshold voltage.

The battery balancing apparatus may further include a second selector configured to selectively electrically connect each of a plurality of batteries included in a second battery group between a third node and a fourth node. The detector may be configured to output a second voltage signal indicating voltage of each of the plurality of batteries included in the second battery group. The resistance adjuster may be configured to selectively electrically connect the first resistor, the second resistor, the parallel circuit or the series circuit between the third node and the fourth node. The controller may be configured to determine at least one of the plurality of batteries included in the second battery group as a second balancing target based on the second voltage signal. The second selector may be configured to electrically connect the second balancing target between the third node and the fourth node.

A first end of the first resistor may be electrically connected to the first node. A first end of the second resistor may be electrically connected to the third node. The resistance adjuster may include a first switch connected between the other end of the first resistor and the second node, a second switch connected between a second end of the second resistor and the fourth node, a third switch connected between the first node and the third node, a fourth switch connected between the second end of the second resistor and the second node, a fifth switch connected between the second end of the first resistor and the third node, and a sixth switch connected between the first node and the fourth node.

The controller may be configured to turn on the fourth switch and the fifth switch and turn off the first switch, the second switch, the third switch and the sixth switch so that the series circuit is electrically connected between the first node and the second node, when a voltage of the first balancing target is higher than a voltage of the second balancing target and a second voltage difference between the first balancing target and the second balancing target is smaller than a fourth threshold voltage.

The controller may be configured to turn on the first switch, the fourth switch and the sixth switch and turn off the second switch, the third switch and the fifth switch so that the series circuit is electrically connected between the third node and the fourth node, when a voltage of the second balancing target is higher than a voltage of the first balancing target and a second voltage difference between the first balancing target and the second balancing target is smaller than a fourth threshold voltage.

A battery pack according to another aspect of the present disclosure includes the battery balancing apparatus.

Advantageous Effects

According to at least one of the embodiments of the present disclosure, using a smaller number of resistors than the number of batteries, it is possible to selectively discharge each battery. Accordingly, it is possible to reduce the entire size of the battery balancing apparatus compared to the conventional art requiring resistor(s) for each battery.

In addition, according to at least one of the embodiments of the present disclosure, it is possible to effectively manage the time required for balancing, heat generation during balancing and the balancing precision by connecting a resistor, a series circuit of two resistors or a parallel circuit of two resistors to a balancing target in parallel depending on the voltage of a battery determined as the balancing target.

The effects of the present disclosure are not limited to the effects mentioned above, and these and other effects will be clearly understood by those skilled in the art from the appended claims.

BRIEF DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

BEST MODE

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Additionally, in describing the present disclosure, when it is deemed that a certain detailed description of relevant known elements or functions renders the key subject matter of the present disclosure ambiguous, the detailed description is omitted herein.

The terms including the ordinal number such as "first", "second" and the like, are used to distinguish one element from another among various elements, but not intended to limit the elements by the terms.

Unless the context clearly indicates otherwise, it will be understood that the term "comprises" when used in this specification, specifies the presence of stated elements, but does not preclude the presence or addition of one or more other elements. Additionally, the term <control unit> as used herein refers to a processing unit of at least one function or operation, and this may be implemented by either hardware or software or a combination of hardware and software.

In addition, throughout the specification, it will be further understood that when an element is referred to as being "connected to" another element, it can be directly connected to the other element or intervening elements may be present.

Figure 1:
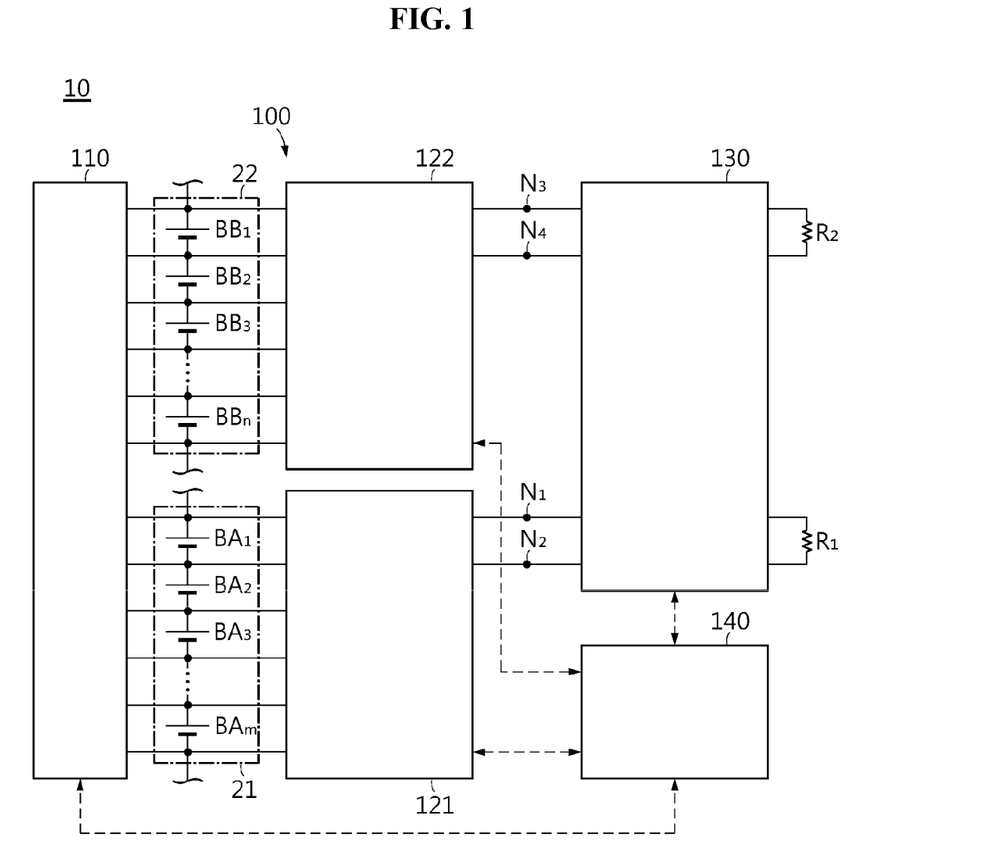
FIG. 1 is a schematic diagram showing a configuration of a battery pack according to the present disclosure.

FIG. 1 is a schematic diagram showing the configuration of a battery pack according to the present disclosure.

Referring to FIG. 1, the battery pack 10 includes a battery group 21 and a battery balancing apparatus 100 (hereinafter referred to as an 'apparatus'). The battery pack 10 may further include a battery group 22. The battery group 22 may be electrically connected in series to the battery group 21.

The battery group 21 includes m batteries (m is a natural number of 2 or greater), and the reference signs $BA_1 \sim BA_m$ are affixed in that order. The plurality of batteries $BA_1 \sim BA_m$ is electrically connected in series.

The battery group 22 includes n batteries (n is a natural number of 2 or greater), and the reference signs $BB_1 \sim BB_n$ are affixed in that order. The plurality of batteries $BB_1 \sim BB_n$ is electrically connected in series. m and n may be equal or different from each other.

The apparatus 100 balances the state of charge (SOC) of the plurality of batteries $BA_1 \sim BA_m$. The apparatus 100 includes a detection unit 110, a resistor $R_1$, a resistor $R_2$, a selection unit 121, a resistance adjustment unit 130 and a control unit 140.

The apparatus 100 may further include a selection unit 122. The apparatus 100 may balance the SOC of the plurality of batteries $BB_1 \sim BB_n$.

The resistor $R_1$ and the resistor $R_2$ may have the same or different resistances. For example, the resistance of the resistor $R_1$ may be 0.05Ω, and the resistance of the resistor $R_2$ may be 0.01Ω. The resistor $R_1$ and the resistor $R_2$, either alone or in electrical combination, are provided to consume electrical energy stored in each battery selected as a balancing target from the plurality of batteries $BA_1 \sim BA_m$ and/or the plurality of batteries $BB_1 \sim BB_n$.

The detection unit 110 includes a voltage detection circuit, and may optionally further include a temperature detection circuit. The voltage detection circuit may include at least one voltage sensor. The voltage detection circuit may be electrically connected to positive and negative terminals of each of the plurality of batteries $BA_1 \sim BA_m$ through a sensing line to detect the voltage of each of the plurality of batteries $BA_1 \sim BA_m$ in each cycle and transmit a voltage signal indicating the detected voltage to the control unit 140. The voltage detection circuit may be electrically connected to positive and negative terminals of each of the plurality of batteries $BB_1 \sim BB_n$ through the sensing line to detect the voltage of each of the plurality of batteries $BB_1 \sim BB_n$ in each cycle and transmit a voltage signal indicating the detected voltage to the control unit 140.

The selection unit 121 is configured to selectively electrically connect the positive terminal of each of the plurality of batteries $BA_1 \sim BA_m$ included in the battery group 21 to a node $N_1$. The selection unit 121 is configured to selectively electrically connect the negative terminal of each of the plurality of batteries $BA_1 \sim BA_m$ included in the battery group 21 to a node $N_2$.

The selection unit 122 is configured to selectively electrically connect the positive terminal of each of the plurality of batteries $BB_1 \sim BB_n$ included in the battery group 22 to a node $N_3$. The selection unit 122 is configured to selectively electrically connect the negative terminal of each of the plurality of batteries $BB_1 \sim BB_n$ included in the battery group 22 to a node $N_4$.

The resistance adjustment unit 130 is configured to selectively electrically connect one of the resistor $R_1$, the resistor $R_2$, a series circuit and a parallel circuit between the node $N_1$ and the node $N_2$. The resistance adjustment unit 130 may be further configured to selectively electrically connect one of the resistor $R_1$, the resistor $R_2$, the series circuit and the parallel circuit between the node $N_3$ and the node $N_4$.

The series circuit refers to a circuit in which the resistor $R_1$ is electrically connected in series to the resistor $R_2$. The parallel circuit refers to a circuit in which the resistor $R_1$ is electrically connected in parallel to the resistor $R_2$. Here, the resistance of the series circuit is higher than the resistance of each of the resistor $R_1$ and the resistor $R_2$. The resistance of the parallel circuit is lower than the resistance of each of the resistor $R_1$ and the resistor $R_2$.

The control unit 140 is operably coupled to the detection unit 110, the selection unit 121 and the resistance adjustment unit 130. The control unit 140 may be further operably coupled to the selection unit 122.

The control unit 140 may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors and electrical units for performing other functions. The control unit 140 may include a memory. The memory stores data, instructions and software required for the entire operation of the apparatus 100, and may include at least one type of storage medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM) and programmable read-only memory (PROM).

The control unit 140 may receive a first voltage signal from the detection unit 110. Additionally, the control unit 140 may further receive a second voltage signal from the detection unit 110. The first voltage signal may indicate an open circuit voltage (OCV) of each of the plurality of batteries $BA_1 \sim BA_m$. The second voltage signal may indicate OCV of each of the plurality of batteries $BB_1 \sim BB_n$.

The control unit 140 may determine at least one of the plurality of batteries $BA_1 \sim BA_m$ as a balancing target based on the first voltage signal. Hereinafter, the balancing target determined from the battery group 21 may be referred to as a 'first balancing target'.

The control unit 140 may determine the State Of Charge (SOC) of each of the plurality of batteries $BA_1 \sim BA_m$ from an OCV-SOC map recorded in the memory based on the OCV of each of the plurality of batteries $BA_1 \sim BA_m$. The first balancing target includes a battery having the maximum OCV (or the maximum SOC) among the plurality of batteries $BA_1 \sim BA_m$. The first balancing target may further include at least one battery having OCV that is higher than the minimum OCV of the battery group 21 by a preset voltage or more among the plurality of batteries $BA_1 \sim BA_m$. The minimum OCV of the battery group 21 is the lowest OCV among the OCVs of each of the plurality of batteries $BA_1 \sim BA_m$. That is, any one of the plurality of batteries $BA_1 \sim BA_m$ or at least two adjacent batteries connected in series may be determined as the first balancing target.

For example, assume that the preset voltage is 0.01V, the minimum OCV of the battery group 21 is 3.30V, the OCV (the maximum OCV) of the battery $BA_1$ is 3.34V, the OCV of the battery $BA_2$ is 3.33V, the OCV of the battery $BA_3$ is 3.32V, the OCV of the battery $BA_4$ is 3.305V, and the OCV of the battery $BA_5$ is 3.31V. In this case, the battery $BA_1$ is included in the first balancing target. Each of the battery $BA_2$ and the battery $BA_3$ has the OCV that is higher than 3.30V by 0.01V or more and is connected in series to the battery $BA_1$, and thus the battery $BA_2$ and the battery $BA_3$ may be included in the first balancing target. The OCV of the battery $BA_4$ is not higher than 3.30V by 0.01V or more, and thus the battery $BA_4$ is not included in the first balancing target. The OCV of the battery $BA_5$ is higher than 3.30V by 0.01V or more, but the battery $BA_5$ is connected to the batteries $BA_1 \sim BA_3$ with the battery $BA_4$ interposed between the battery $BA_5$ and the batteries $BA_1 \sim BA_3$, and thus the battery $BA_5$ is not included in the first balancing target.

The control unit 140 may determine at least one of the plurality of batteries $BB_1 \sim BB_n$ as a balancing target based on the second voltage signal. Hereinafter, the balancing target determined from the battery group 22 may be referred to as a 'second balancing target'.

The control unit 140 may determine the SOC of each of the plurality of batteries $BB_1 \sim BB_n$ from the OCV-SOC map based on the OCV of each of the plurality of batteries $BB_1 \sim BB_n$. The second balancing target includes a battery having the maximum OCV (or the maximum SOC) among the plurality of batteries $BB_1 \sim BB_n$. The second balancing target may further include at least one battery having OCV that is higher than the minimum OCV of the battery group 22 by the preset voltage or more among the plurality of batteries $BB_1 \sim BB_n$. That is, any one of the plurality of batteries $BB_1 \sim BB_n$ or at least two adjacent batteries connected in series may be determined as the second balancing target.

The control unit 140 may determine a reference voltage for the first balancing target (hereinafter referred to as a 'first reference voltage') based on the first voltage signal. In an example, when the first balancing target includes only one battery (e.g., $BA_1$), the first reference voltage may be equal to the minimum OCV of the battery group 21. In another example, when the first balancing target includes at least two batteries (e.g., $BA_1$, $BA_2$, $BA_3$) connected in series, the first reference voltage may be equal to the multiplication of the minimum OCV of the battery group 21 by the number of batteries included in the first balancing target. Alternatively, the first reference voltage may be voltage of a preset value.

The control unit 140 may determine a reference voltage for the second balancing target (hereinafter referred to as a 'second reference voltage') based on the second voltage signal. In an example, when the second balancing target includes only one battery (e.g., $BB_1$), the second reference voltage may be equal to the minimum OCV of the battery group 22. In another example, when the second balancing target includes at least two batteries (e.g., $BB_1$, $BB_2$) connected in series, the second reference voltage may be equal to the multiplication of the minimum OCV of the battery group 22 by the number of batteries included in the second balancing target. Alternatively, the second reference voltage may be voltage of a preset value.

When the first balancing target is determined, the control unit 140 may request the selection unit 121 to electrically connect the first balancing target between the node $N_1$ and the node $N_2$. The selection unit 121 may electrically separate the plurality of batteries $BA_1 \sim BA_m$ from the node $N_1$ and the node $N_2$ when no command is received from the control unit 140.

When the second balancing target is determined, the control unit 140 may request the selection unit 122 to electrically connect the second balancing target between the node $N_3$ and the node $N_4$. The selection unit 122 may electrically separate the plurality of batteries $BB_1 \sim BB_n$ from the node $N_3$ and the node $N_4$ when no command is received from the control unit 140.

When the first balancing target is determined, the control unit 140 may control the resistance adjustment unit 130 so that one of the resistor $R_1$, the resistor $R_2$, the series circuit and the parallel circuit is electrically connected between the node $N_1$ and the node $N_2$. When the second balancing target is determined, the control unit 140 may control the resistance adjustment unit 130 so that one of the resistor $R_1$, the resistor $R_2$, the series circuit and the parallel circuit is electrically connected between the node $N_3$ and the node $N_4$. Controlling the resistance adjustment unit 130 represents controlling the ON/OFF of each switch included in the resistance adjustment unit 130.

When the first balancing target is determined, one of the resistor $R_1$, the resistor $R_2$, the series circuit and the parallel circuit is electrically connected between the node $N_1$ and the node $N_2$ by the resistance adjustment unit 130 to form a closed loop for discharging of the first balancing target.

When the second balancing target is determined, one of the resistor $R_1$, the resistor $R_2$, the series circuit and the parallel circuit is electrically connected between the node $N_3$ and the node $N_4$ by the resistance adjustment unit 130 to form a closed loop for discharging of the second balancing target.

When the first balancing target is determined, the control unit 140 may generate a first command. The first command is outputted to the selection unit 121. The selection unit 121 electrically connects the first balancing target between the node $N_1$ and the node $N_2$ in response to the first command.

When the second balancing target is determined, the control unit 140 may generate a second command. The second command is outputted to the selection unit 122. The selection unit 122 electrically connects the second balancing target between the node $N_3$ and the node $N_4$ in response to the second command.

Figure 2:
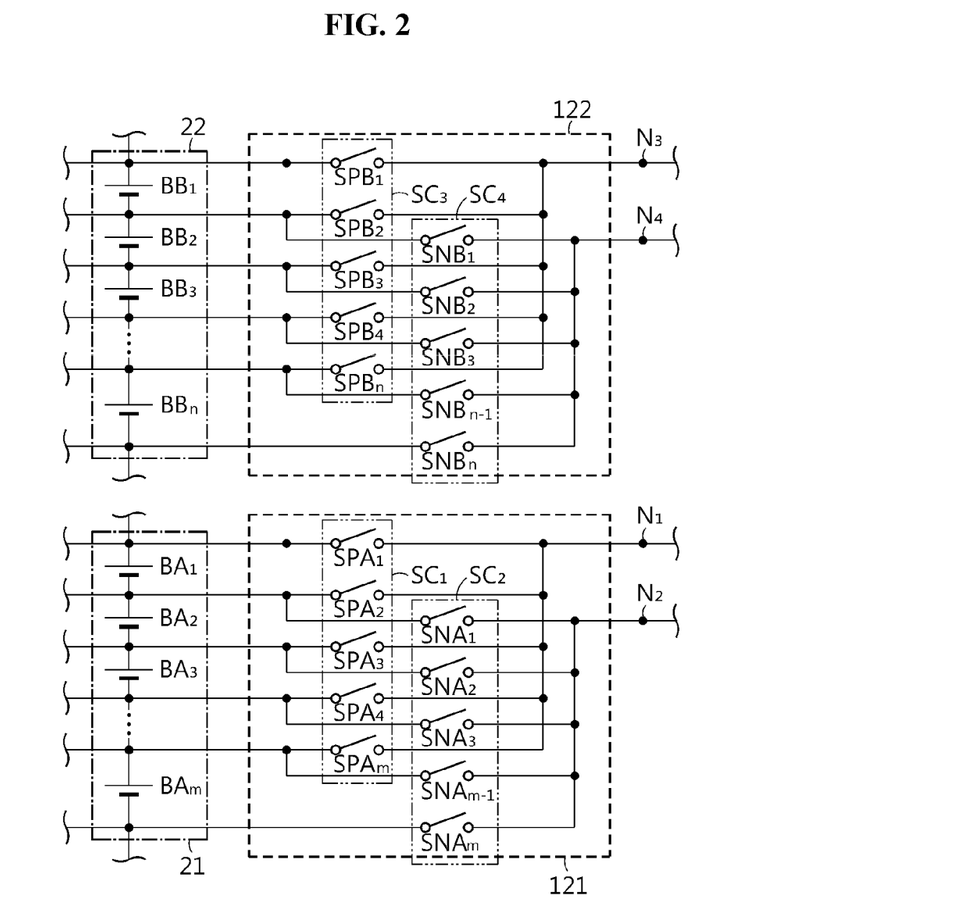
FIG. 2 is a diagram showing a detailed configuration of each selection unit for a battery balancing apparatus according to a first embodiment of the present disclosure.
Figure 3:
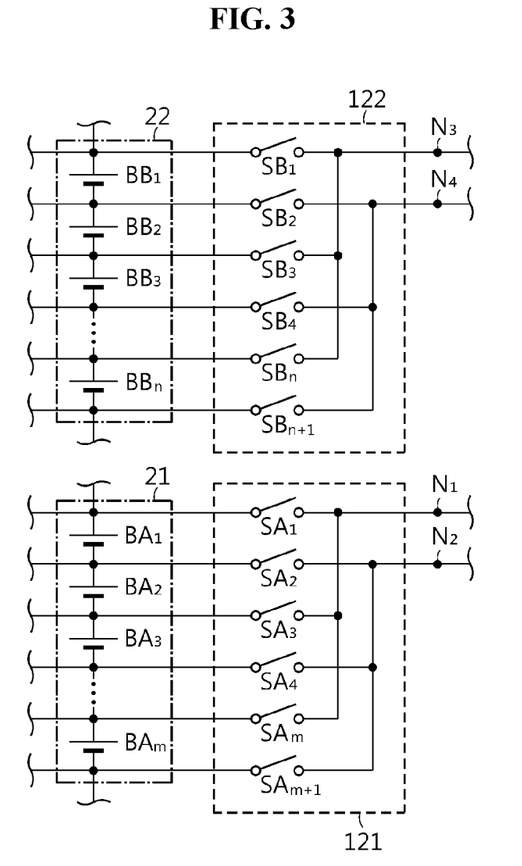
FIG. 3 is a diagram showing a detailed configuration of each selection unit for a battery balancing apparatus according to a second embodiment of the present disclosure.

Hereinafter, the battery balancing apparatus 100 according to various embodiments of the present disclosure will be described in more detail with reference to FIGS. 2 to 6. FIGS. 1 to 3 show the battery group 22 and the selection unit 122, but the battery group 22 may be removed from the battery pack 10, and the selection unit 122 may be removed from the apparatus 100.

FIG. 2 is a diagram showing the detailed configuration of each selection unit for the battery balancing apparatus according to an embodiment of the present disclosure. For convenience of description, illustrations of the detection unit 110, the resistor R1, the resistor $R_2$, the resistance adjustment unit 130 and the control unit 140 are omitted from FIG. 2.

Referring to FIGS. 1 and 2, the selection unit 121 includes a switching circuit $SC_1$ and a switching circuit $SC_2$.

The switching circuit $SC_1$ includes a plurality of switches $SPA_1 \sim SPA_m$. Each of the plurality of switches $SPA_1 \sim SPA_m$ has one end connected to the positive terminal of each of the plurality of batteries $BA_1 \sim BA_m$. That is, when k=1~m, one end of the switch $SPA_k$ is connected to the positive terminal of the battery $BA_k$. The other end of each of the plurality of switches $SPA_1 \sim SPA_m$ is connected to the node $N_1$.

The switching circuit $SC_2$ includes a plurality of switches $SNA_1 \sim SNA_m$. Each of the plurality of switches $SNA_1 \sim SNA_m$ has one end connected to the negative terminal of each of the plurality of batteries $BA_1 \sim BA_m$. That is, one end of the switch $SNA_k$ is connected to the negative terminal of the battery $BA_k$. The other end of each of the plurality of switches $SNA_1 \sim SNA_m$ is connected to the node $N_2$.

When the switch $SPA_k$ is turned on, the positive terminal of the battery $BA_k$ is electrically connected to the node $N_1$ through the switch $SPA_k$. When the switch $SPA_k$ is turned off, the positive terminal of the battery $BA_k$ is electrically separated from the node $N_1$.

When the switch $SNA_k$ is turned on, the negative terminal of the battery $BA_k$ is electrically connected to the node $N_2$ through the switch $SNA_k$. When the switch $SNA_k$ is turned off, the negative terminal of the battery $BA_k$ is electrically separated from the node $N_2$.

When any one battery BA (i=1~m) is determined as the first balancing target among the plurality of batteries $BA_1 \sim BA_m$, the control unit 140 generates a first command. The first command may include a signal (e.g., voltage of a predetermined level or more) for turning on the switch $SPA_1$ and a signal for turning on the switch $SNA_1$.

Alternatively, when at least two batteries $BA_1 \sim BA_h$ (h>i) are determined as the first balancing target among the plurality of batteries $BA_1 \sim BA_m$, the control unit 140 generates a first command. The first command may include a signal (e.g., voltage of a predetermined level or more) for turning on the switch $SPA_1$ and a signal for turning on the switch $SNA_h$.

The selection unit 122 includes a switching circuit $SC_3$ and a switching circuit $SC_4$.

The switching circuit $SC_3$ includes a plurality of switches $SPB_1 \sim SPB_n$. Each of the plurality of switches $SPB_1 \sim SPB_n$ has one end connected to the positive terminal of each of the plurality of batteries $BB_1 \sim BB_n$. One end of the switch $SPB_k$ is connected to the positive terminal of the battery $BB_k$. The other end of each of the plurality of switches $SPB_1 \sim SPB_n$ is connected to the node $N_3$.

The switching circuit $SC_4$ includes a plurality of switches $SNB_1 \sim SNB_n$. Each of the plurality of switches $SNB_1 \sim SNB_n$ has one end connected to the negative terminal of each of the plurality of batteries $BB_1 \sim BB_n$. That is, one end of the switch $SNB_k$ is connected to the negative terminal of the battery $BB_k$. The other end of each of the plurality of switches $SNB_1 \sim SNB_n$ is connected to the node $N_4$.

When the switch $SPB_k$ is turned on, the positive terminal of the battery $BB_k$ is electrically connected to the node $N_3$ through the switch $SPB_k$. When the switch $SPB_k$ is turned off, the positive terminal of the battery $BB_k$ is electrically separated from the node $N_3$.

When the switch $SNB_k$ is turned on, the negative terminal of the battery $BB_k$ is electrically connected to the node $N_4$ through the switch $SNB_k$. When the switch $SNB_k$ is turned off, the negative terminal of the battery $BB_k$ is electrically separated from the node $N_4$.

When any one battery $BB_j$ (j=1~n) is determined as the second balancing target among the plurality of batteries $BB_1 \sim BB_n$, the control unit 140 generates a second command. The second command may include a signal (e.g., voltage of a predetermined level or more) for turning on the switch $SPB_j$ and a signal for turning on the switch $SNB_j$.

Alternatively, when at least two batteries $BB_j \sim BB_g$ (g>j) are determined as the second balancing target among the plurality of batteries $BB_1 \sim BB_n$, the control unit 140 generates a second command. The second command may include a signal (e.g., voltage of a predetermined level or more) for turning on the switch $SPB_j$ and a signal for turning on the switch $SNB_g$.

FIG. 3 is a diagram showing the detailed configuration of each selection unit for the battery balancing apparatus according to an embodiment of the present disclosure.

For convenience of description, illustrations of the detection unit 110, the resistor R1, the resistor $R_2$, the resistance adjustment unit 130 and the control unit 140 are omitted from FIG. 2.

Referring to FIGS. 1 and 3, the selection unit 121 includes a plurality of switches $SA_1 \sim SA_{m+1}$.

Assume u=1~m+1. When u is an odd number, one end of the switch $SA_u$ is connected to the positive terminal of the battery $BA_u$. The other end of the switch $SA_u$ is connected to the node $N_1$. When the switch $SA_u$ is turned on, the positive terminal of the battery $BA_u$ is electrically connected to the node $N_1$ through the switch $SA_u$. When the switch $SA_u$ is turned off, the positive terminal of the battery $BA_u$ is electrically separated from the node $N_1$.

When u is an even number, one end of the switch $SA_u$ is connected to the negative terminal of the battery $BA_u$. The other end of the switch $SA_u$ is connected to the node $N_2$. When the switch $SA_u$ is turned on, the negative terminal of the battery $BA_u$ is electrically connected to the node $N_2$ through the switch $SA_u$. On the contrary, when the switch $SA_u$ is turned off, the negative terminal of the battery BA is electrically separated from the node $N_2$.

When the battery $BA_1$ is determined as the first balancing target, the control unit 140 generates a first command. The first command may include a signal for turning on the switch $SA_1$ and a signal for turning on the switch $SA_{1+1}$.

The selection unit 122 includes a plurality of switches $SB_1 \sim SB_{n+1}$.

When u is an odd number, one end of the switch $SB_u$ is connected to the positive terminal of the battery $BB_u$. The other end of the switch $SB_u$ is connected to the node $N_3$. When the switch $SB_u$ is turned on, the positive terminal of the battery $BB_u$ is electrically connected to the node $N_3$ through the switch $SB_u$. When the switch $SB_u$ is turned off, the positive terminal of the battery $BB_u$ is electrically separated from the node $N_3$.

When u is an even number, one end of the switch $SB_u$ is connected to the negative terminal of the battery $BB_u$. The other end of the switch $SB_u$ is connected to the node $N_4$. When the switch $SB_u$ is turned on, the negative terminal of the battery $BB_u$ is electrically connected to the node $N_4$ through the switch $SB_u$. When the switch $SB_u$ is turned off, the negative terminal of the battery $BB_u$ is electrically separated from the node $N_4$.

When the battery $BB_j$ is determined as the second balancing target, the control unit 140 generates a second command. The second command may include a signal (e.g., voltage of a predetermined level or more) for turning on the switch $SB_j$ and a signal for turning on the switch $SB_{j+1}$.

Figure 4:
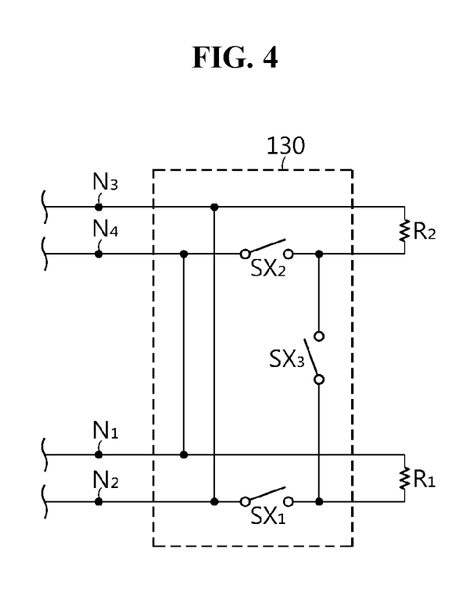
FIG. 4 is a diagram showing a detailed configuration of a resistance adjustment unit for a battery balancing apparatus according to a third embodiment of the present disclosure.

FIG. 4 is a diagram showing the detailed configuration of a resistance adjustment unit 130 for a battery balancing apparatus according to a third embodiment of the present disclosure. For convenience of description, illustrations of the detection unit 110, the selection unit 121, the selection unit 122 and the control unit 140 are omitted from FIG. 2. Assume that the resistance of the resistor $R_1$ is higher than the resistance of the resistor $R_2$.

The battery balancing apparatus 100 according to the third embodiment includes the selection unit 121 according to the first or second embodiment. The battery balancing apparatus 100 according to the third embodiment may further include the selection unit 122 according to the first or second embodiment.

Referring to FIGS. 1 to 4, the resistance adjustment unit 130 includes a switch $SX_1$ and a switch $SX_2$. The resistance adjustment unit 130 may further include a switch $SX_3$.

One end of the resistor $R_1$ is connected to the node $N_1$. One end of the resistor $R_2$ may be connected to the node $N_2$. One end of the resistor $R_2$ may be further connected to the node $N_3$. As shown, the node $N_1$ may be connected to the node $N_4$, and the node $N_2$ may be connected to the node $N_3$.

The switch $SX_1$ is connected between the other end of the resistor $R_1$ and the node $N_2$. When the switch $SX_1$ is turned on, the resistor $R_1$ is electrically connected between the node $N_1$ and the node $N_2$ through the switch $SX_1$. When the switch $SX_1$ is turned on, the resistor $R_1$ may be also electrically connected between the node $N_3$ and the node $N_4$.

The switch $SX_2$ is connected between the other end of the resistor $R_2$ and the node $N_1$. When the switch $SX_2$ is turned on, the resistor $R_2$ is electrically connected between the node $N_1$ and the node $N_2$. When the switch $SX_2$ is turned on, the resistor $R_2$ may be also electrically connected between the node $N_3$ and the node $N_4$ through the switch $SX_2$.

The switch $SX_3$ is connected between the other end of the resistor $R_1$ and the other end of the resistor $R_2$.

When the switch $SX_3$ is turned off and the switch $SX_1$ and the switch $SX_2$ are turned on, the parallel circuit of the resistor $R_1$ and the resistor $R_2$ is electrically connected between the node $N_1$ and the node $N_2$.

When the switch $SX_3$ is turned on and the switch $SX_1$ and the switch $SX_2$ are turned off, the series circuit of the resistor $R_1$ and the resistor $R_2$ is electrically connected between the node $N_1$ and the node $N_2$. The series circuit may be also electrically connected between the node $N_3$ and the node $N_4$.

The control unit 140 is configured to control the ON/OFF of each of the switch $SX_1$, the switch $SX_2$ and the switch $SX_3$ based on a voltage difference between the voltage of the first balancing target and the first reference voltage (hereinafter referred to as a 'first voltage difference'). When the first balancing target includes at least two batteries, the voltage of the first balancing target is the sum of voltages of each battery included in the first balancing target.

When the first voltage difference is equal to or larger than a first threshold voltage (e.g., 0.05V) and smaller than a second threshold voltage (e.g., 0.08V), the control unit 140 turns on the switch $SX_1$ and turns off the switch $SX_2$ and the switch $SX_3$ so that the resistor $R_1$ is electrically connected between the node $N_1$ and the node $N_2$.

When the first voltage difference is equal to or larger than the second threshold voltage and smaller than a third threshold voltage (e.g., 0.10V), the control unit 140 turns on the switch $SX_2$ and turns off the switch $SX_1$ and the switch $SX_3$ so that the resistor $R_2$ is electrically connected between the node $N_1$ and the node $N_2$.

When the first voltage difference is equal to or larger than the third threshold voltage, the control unit 140 turns on the switch $SX_1$ and the switch $SX_2$ and turns off the switch $SX_3$. Accordingly, the parallel circuit is electrically connected between the node $N_1$ and the node $N_2$ through the resistance adjustment unit 130.

When the first voltage difference is smaller than the first threshold voltage, the control unit 140 turns off the switch $SX_1$ and the switch $SX_2$ and turns on the switch $SX_3$ so that the series circuit is electrically connected between the node $N_1$ and the node $N_2$.

As the first voltage difference increases, the resistance supplied between the node $N_1$ and the node $N_2$ by the resistance adjustment unit 130 gradually decreases. Accordingly, it is possible to discharge the first balancing target fast. On the contrary, as the first voltage difference decreases, the resistance supplied between the node $N_1$ and the node $N_2$ by the resistance adjustment unit 130 gradually increases. Accordingly, it is possible to precisely adjust the SOC of each battery of the first balancing target.

Figure 5:
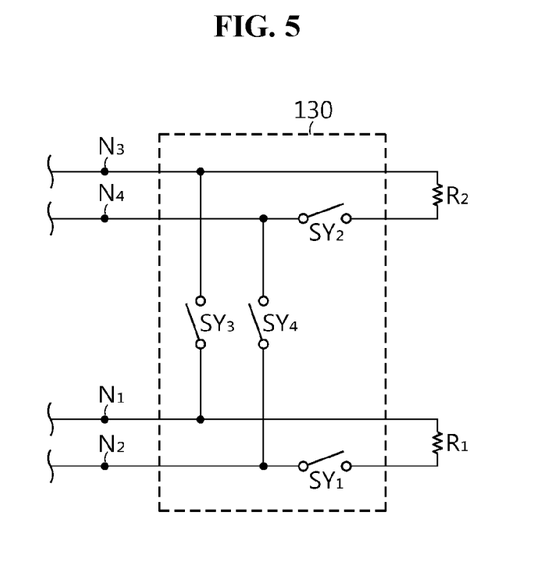
FIG. 5 is a diagram showing a detailed configuration of a resistance adjustment unit for a battery balancing apparatus according to a fourth embodiment of the present disclosure.

FIG. 5 is a diagram showing the detailed configuration of a resistance adjustment unit 130 for a battery balancing apparatus according to a fourth embodiment of the present disclosure. For convenience of description, assume that the resistance of the resistor $R_1$ is higher than the resistance of the resistor $R_2$.

The battery balancing apparatus 100 according to the fourth embodiment includes the selection unit 121 according to the first or second embodiment. The battery balancing apparatus 100 according to the fourth embodiment may further include the selection unit 122 according to the first or second embodiment.

Referring to FIGS. 1 to 3 and 5, the resistance adjustment unit 130 includes a switch $SY_1$ and a switch $SY_2$. The resistance adjustment unit 130 further includes at least one of a switch $SY_3$ and a switch $SY_4$.

One end of the resistor $R_1$ is connected to the node $N_1$. One end of the resistor $R_2$ may be connected to the node $N_3$. As shown, the node $N_1$ may be connected to the node $N_3$ through the switch $SY_3$, and the node $N_2$ may be connected to the node $N_4$ through the switch $SY_4$.

The switch $SY_1$ is connected between the other end of the resistor $R_1$ and the node $N_2$. When the switch $SY_1$ is turned on, the resistor $R_1$ is electrically connected between the node $N_1$ and the node $N_2$ through the switch $SY_1$.

The switch $SY_2$ may be connected between the other end of the resistor $R_2$ and the node $N_4$. When the switch $SY_2$ is turned on, the resistor $R_2$ may be electrically connected between the node $N_3$ and the node $N_4$ through the switch $SY_2$.

The switch $SY_3$ is connected between the node $N_1$ and one end of the resistor $R_2$. The switch $SY_3$ may be replaced with a conductor connecting the node $N_1$ and the node $N_3$.

The switch $SY_4$ is connected between the node $N_2$ and the node $N_4$. The switch $SY_4$ may be replaced with a conductor connecting the node $N_2$ and the node $N_4$.

When the switch $SY_1$, the switch $SY_2$, the switch $SY_3$ and the switch $SY_4$ are turned on together, the parallel circuit of the resistor $R_1$ and the resistor $R_2$ is electrically connected between the node $N_1$ and the node $N_2$ and between the node $N_3$ and the node $N_4$.

When the switch $SY_1$ is turned off and the switch $SY_2$, the switch $SY_3$ and the switch $SY_4$ are turned on, the resistor $R_2$ is electrically connected between the node $N_1$ and the node $N_2$ and between the node $N_3$ and the node $N_4$.

When the switch $SY_2$ is turned off and the switch $SY_1$, the switch $SY_3$ and the switch $SY_4$ are turned on, the resistor $R_1$ is electrically connected between the node $N_1$ and the node $N_2$ and between the node $N_3$ and the node $N_4$.

The control unit 140 is configured to control the ON/OFF of each of the switch $SY_1$, the switch $SY_2$, the switch $SY_3$ and the switch $SY_4$ based on the first voltage difference.

When the first voltage difference is equal to or larger than the first threshold voltage and smaller than the second threshold voltage, the control unit 140 may turn on the switch $SY_1$ and turn off at least one of the switch $SY_2$, the switch $SY_3$ and the switch $SY_4$ so that the resistor $R_1$ is electrically connected between the node $N_1$ and the node $N_2$.

When the first voltage difference is equal to or larger than the second threshold voltage and smaller than the third threshold voltage, the control unit 140 may turn on the switch $SY_2$, the switch $SY_3$ and the switch $SY_4$ and turn off the switch $SY_1$ so that the resistor $R_2$ is electrically connected between the node $N_1$ and the node $N_2$.

When the first voltage difference is equal to or larger than the third threshold voltage, the control unit 140 may turn on the switch $SY_1$, the switch $SY_2$, the switch $SY_3$ and the switch $SY_4$ so that the parallel circuit is electrically connected between the node $N_1$ and the node $N_2$.

That is, as the first voltage difference increases, the resistance connected between the node $N_1$ and the node $N_2$ gradually decreases. Accordingly, it is possible to discharge the first balancing target fast. On the contrary, as the first voltage difference decreases, the resistance connected between the node $N_1$ and the node $N_2$ gradually increases. Accordingly, it is possible to precisely adjust the SOC of each battery of the first balancing target.

The battery balancing apparatus 100 according to the fourth embodiment may further include the resistance adjustment unit 130 according to the third embodiment described above with reference to FIG. 4.

Figure 6:
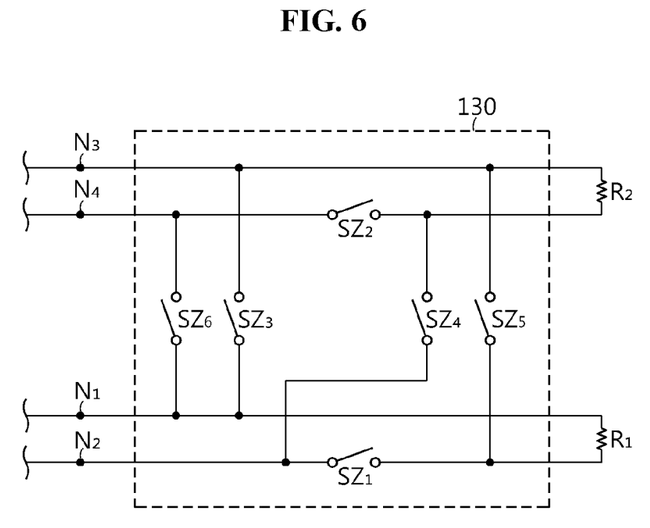
FIG. 6 is a diagram showing a detailed configuration of a resistance adjustment unit for a battery balancing apparatus according to a fifth embodiment of the present disclosure.

FIG. 6 is a diagram showing the detailed configuration of a resistance adjustment unit 130 for a battery balancing apparatus according to a fifth embodiment of the present disclosure. For convenience of description, assume that the resistance of the resistor $R_1$ is higher than the resistance of the resistor $R_2$.

The battery balancing apparatus 100 according to the fifth embodiment includes the selection unit 121 according to the first or second embodiment. The battery balancing apparatus 100 according to the fifth embodiment may further include the selection unit 122 according to the first or second embodiment.

Referring to FIGS. 1 to 3 and 6, the resistance adjustment unit 130 includes a switch $SZ_1$ and a switch $SZ_2$. The resistance adjustment unit 130 includes at least one of a switch $SZ_3$ and a switch $SZ_4$. The resistance adjustment unit 130 further includes at least one of a switch $SZ_5$ and a switch $SZ_6$.

One end of the resistor $R_1$ is connected to the node $N_1$. One end of the resistor $R_2$ may be connected to the node $N_3$.

The switch $SZ_1$ is connected between the other end of the resistor $R_1$ and the node $N_2$. When the switch $SZ_1$ is turned on, the resistor $R_1$ is electrically connected between the node $N_1$ and the node $N_2$ through the switch $SZ_1$.

The switch $SZ_2$ may be connected between the other end of the resistor $R_2$ and the node $N_4$. When the switch $SZ_2$ is turned on, the resistor $R_2$ may be electrically connected between the node $N_3$ and the node $N_4$ through the switch $SZ_2$.

The switch $SZ_3$ is connected between the node $N_1$ and the node $N_3$. The switch $SZ_3$ may be replaced with a conductor connecting the node $N_1$ and the node $N_3$.

The switch $SZ_4$ is connected between the node $N_2$ and the other end of the resistor $R_2$. The switch $SZ_4$ may be replaced with a conductor connecting the node $N_2$ and the other end of the resistor $R_2$.

The switch $SZ_5$ is connected between the other end of the resistor $R_1$ and the node $N_3$. The switch $SZ_5$ may be replaced with a conductor connecting the other end of the resistor $R_1$ and the node $N_3$.

The switch $SZ_6$ is connected between the node $N_1$ and the node $N_4$. The switch $SZ_6$ may be replaced with a conductor connecting the node $N_1$ and the node $N_4$.

When the switch $SZ_1$, the switch $SZ_2$, the switch $SZ_5$ and the switch $SZ_6$ are turned off and the switch $SZ_3$ and the switch $SZ_4$ are turned on, the resistor $R_2$ is electrically connected between the node $N_1$ and the node $N_2$. Accordingly, electrical energy stored in the first balancing target may be consumed by the resistor $R_2$.

When the switch $SZ_1$, the switch $SZ_2$, the switch $SZ_3$ and the switch $SZ_4$ are turned off and the switch $SZ_5$ and the switch $SZ_6$ are turned on, the resistor $R_1$ is electrically connected between the node $N_3$ and the node $N_4$. Accordingly, electrical energy stored in the second balancing target may be consumed by the resistor $R_1$.

When the switch $SZ_1$ and the switch $SZ_2$ are turned off and the switch $SZ_3$, the switch $SZ_4$, the switch $SZ_5$ and the switch $SZ_6$ are turned on, the resistor $R_2$ is electrically connected between the node $N_1$ and the node $N_2$, and the resistor $R_1$ is electrically connected between the node $N_3$ and the node $N_4$. Accordingly, electrical energy stored in the first balancing target may be consumed by the resistor $R_2$, and at the same time, electrical energy stored in the second balancing target may be consumed by the resistor $R_1$.

When the switch $SZ_1$, the switch $SZ_3$ and the switch $SZ_4$ are turned on and the switch $SZ_2$, the switch $SZ_5$ and the switch $SZ_6$ are turned off, the parallel circuit of the resistor $R_1$ and the resistor $R_2$ is electrically connected between the node $N_1$ and the node $N_2$. Accordingly, electrical energy stored in the first balancing target may be consumed by the parallel circuit.

When the switch $SZ_1$, the switch $SZ_3$ and the switch $SZ_4$ are turned off and the switch $SZ_2$, the switch $SZ_5$ and the switch $SZ_6$ are turned on, the parallel circuit of the resistor $R_1$ and the resistor $R_2$ is electrically connected between the node $N_3$ and the node $N_4$. Accordingly, electrical energy stored in the second balancing target may be consumed by the parallel circuit.

When the switch $SZ_1$, the switch $SZ_2$, the switch $SZ_3$ and the switch $SZ_6$ are turned off and the switch $SZ_4$ and the switch $SZ_5$ are turned on, the series circuit of the resistor $R_1$ and the resistor $R_2$ is electrically connected between the node $N_1$ and the node $N_2$. Accordingly, electrical energy stored in the first balancing target may be consumed by the series circuit.

When the switch $SZ_2$, the switch $SZ_3$ and the switch $SZ_6$ are turned off and the switch $SZ_1$, the switch $SZ_4$ and the switch $SZ_6$ are turned on, the series circuit of the resistor $R_1$ and the resistor $R_2$ is electrically connected between the node $N_3$ and the node $N_4$. Accordingly, electrical energy stored in the second balancing target may be consumed by the series circuit.

The control unit 140 may control the ON/OFF of each of the switch $SZ_1$, the switch $SZ_2$, the switch $SZ_3$, the switch $SZ_4$, the switch $SZ_5$ and the switch $SZ_6$ based on the first voltage difference between the voltage of the first balancing target and the first reference voltage.

When the first voltage difference is equal to or larger than the first threshold voltage and smaller than the second threshold voltage, the control unit 140 may turn on the switch $SZ_1$ and turn off at least one of the switch $SZ_2$, the switch $SZ_3$, the switch $SZ_4$, the switch $SZ_5$ and the switch $SZ_6$ so that the resistor $R_1$ is electrically connected between the node $N_1$ and the node $N_2$.

When the first voltage difference is equal to or larger than the second threshold voltage and smaller than the third threshold voltage, the control unit 140 may turn on the switch $SZ_3$ and the switch $SZ_4$ and turn off at least one of the switch $SZ_1$, the switch $SZ_2$, the switch $SZ_5$ and the switch $SZ_6$ so that the resistor $R_2$ is electrically connected between the node $N_1$ and the node $N_2$.

When the first voltage difference is equal to or larger than the third threshold voltage, the control unit 140 may turn on the switch $SZ_1$, the switch $SZ_3$ and the switch $SZ_4$, and turn off at least one of the switch $SZ_2$, the switch $SZ_5$ and the switch $SZ_6$ so that the parallel circuit is electrically connected between the node $N_1$ and the node $N_2$.

When the first voltage difference is smaller than the first threshold voltage, the control unit 140 may turn on the switch $SZ_4$ and the switch $SZ_5$ and turn off at least one of the switch $SZ_1$, the switch $SZ_2$, the switch $SZ_3$ and the switch $SZ_6$ so that the series circuit is electrically connected between the node $N_1$ and the node $N_2$.

When the first balancing target and the second balancing target are determined, the control unit 140 is configured to control the ON/OFF of each of the switch $SZ_1$, the switch $SZ_2$, the switch $SZ_3$, the switch $SZ_4$, the switch $SZ_5$ and the switch $SZ_6$ based on the voltage of the first balancing target and the voltage of the second balancing target. When the second balancing target includes at least two batteries, the voltage of the second balancing target is the sum of voltages of each battery included in the second balancing target.

When the voltage of the second balancing target is higher than the voltage of the first balancing target and a voltage difference between the first balancing target and the second balancing target (hereinafter referred to as a 'second voltage difference') is equal to or larger than a fourth threshold voltage and smaller than a fifth threshold voltage, the control unit 140 may turn on the switch $SZ_1$ and the switch $SZ_2$, and turn off at least one of the switch $SZ_3$, the switch $SZ_4$, the switch $SZ_5$ and the switch $SZ_6$. Accordingly, electrical energy stored in the first balancing target may be consumed by the resistor $R_1$. Additionally, electrical energy stored in the second balancing target may be consumed by the resistor $R_2$.

The fourth threshold voltage may be equal to the first threshold voltage or the second threshold voltage. The fifth threshold voltage may be equal to the third threshold voltage. Of course, each of the fourth threshold voltage and the fifth threshold voltage may be preset to be different from the first to third threshold voltages.

When the voltage of the first balancing target is higher than the voltage of the second balancing target and the second voltage difference is equal to or larger than the fourth threshold voltage and smaller than the fifth threshold voltage, the control unit 140 may turn off the switch $SZ_1$ and the switch $SZ_2$, and may turn on and off the pair of the switch $SZ_3$ and the switch $SZ_4$ and the pair of the switch $SZ_5$ and the switch $SZ_6$ in an alternating manner according to a predetermined duty cycle. Accordingly, while the pair of the switch $SZ_3$ and the switch $SZ_4$ is turned on and the pair of the switch $SZ_5$ and the switch $SZ_6$ is turned off, electrical energy stored in the first balancing target may be consumed by the resistor $R_2$. Additionally, while the pair of the switch $SZ_3$ and the switch $SZ_4$ is turned off and the pair of the switch $SZ_5$ and the switch $SZ_6$ is turned on, electrical energy stored in the second balancing target may be consumed by the resistor $R_1$.

When the voltage of the second balancing target is higher than the voltage of the first balancing target and the second voltage difference is smaller than the fourth threshold voltage, the control unit 140 may turn on the switch $SZ_1$, the switch $SZ_4$ and the switch $SZ_6$ and turn off at least one of the switch $SZ_2$, the switch $SZ_3$ and the switch $SZ_5$ so that the series circuit is electrically connected between the node $N_3$ and the node $N_4$. Accordingly, electrical energy stored in the second balancing target may be consumed by the series circuit. Additionally, electrical energy stored in the first balancing target may be consumed by the resistor $R_1$.

When the voltage of the first balancing target is higher than the voltage of the second balancing target and the second voltage difference is smaller than the fourth threshold voltage, the control unit 140 turns on the switch $SZ_4$ and the switch $SZ_5$ and turns off at least one of the switch $SZ_1$, the switch $SZ_2$, the switch $SZ_3$ and the switch $SZ_6$ so that the series circuit is electrically connected between the node $N_1$ and the node $N_2$. Accordingly, electrical energy stored in the first balancing target may be consumed by the series circuit.

When the voltage of the second balancing target is higher than the first balancing target and the second voltage difference is equal to or larger than the fifth threshold voltage, the control unit 140 turns on the switch $SZ_2$, the switch $SZ_5$ and the switch $SZ_6$ and turns off at least one of the switch $SZ_1$, the switch $SZ_3$ and the switch $SZ_4$ so that the parallel circuit is electrically connected between the node $N_3$ and the node $N_4$. Accordingly, electrical energy stored in the second balancing target may be consumed by the parallel circuit.

When the voltage of the first balancing target is higher than the voltage of the second balancing target and the second voltage difference is equal to or larger than the fifth threshold voltage, the control unit 140 turns on the switch $SZ_1$, the switch $SZ_3$ and the switch $SZ_4$ and turns off at least one of the switch $SZ_2$, the switch $SZ_5$ and the switch $SZ_6$ so that the parallel circuit is electrically connected between the node $N_1$ and the node $N_2$. Accordingly, electrical energy stored in the first balancing target may be consumed by the parallel circuit.

Alternatively, when the voltage of the first balancing target is higher than the voltage of the second balancing target and the second voltage difference is equal to or larger than the fifth threshold voltage, the control unit 140 may turn on the switch $SZ_1$, the switch $SZ_2$, the switch $SZ_5$ and the switch $SZ_6$ and turn off at least one of the switch $SZ_3$ and the switch $SZ_4$. Accordingly, even though at least one of the switch $SZ_3$ and the switch $SZ_4$ is defective (e.g., impossible to close), it is possible to electrically connect the parallel circuit between the node $N_1$ and the node $N_2$.

The battery balancing apparatus 100 according to the fifth embodiment may further include the resistance adjustment unit 130 according to the third embodiment described above with reference to FIG. 4 or the fourth embodiment described above with reference to FIG. 5.

Each switch included in the selection unit 121, the selection unit 122 and the resistance adjustment unit 130 described above with reference to FIGS. 2 to 6 may be a known switching device that can be controlled using an electrical signal, for example, Metal Oxide Semiconductor Field Effect transistor (MOSFET), and is operably coupled to the control unit 140 through a signal line. Each switch may be turned on in response to a first control voltage (e.g., 3V) outputted by the control unit 140. Each switch may be turned off in response to a second control voltage (e.g., 0V)

outputted by the control unit 140. The output of the second control voltage may represent the stop of the output of the first control voltage.

The embodiments of the present disclosure described hereinabove are not implemented only through the apparatus and method, and may be implemented through programs that perform functions corresponding to the configurations of the embodiments of the present disclosure or recording media having the programs recorded thereon, and such implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

What is claimed is:

1. A battery balancing apparatus, comprising:
    a detector configured to output a first voltage signal indicating voltage of each of a plurality of batteries included in a first battery group;
    a first selector configured to selectively electrically connect each of the plurality of batteries included in the first battery group between a first node and a second node;
    a resistance adjuster configured to selectively electrically connect a first resistor, a second resistor, a series circuit of the first resistor and the second resistor or a parallel circuit of the first resistor and the second resistor between the first node and the second node; and
    a controller operably coupled to the detector, the first selector and the resistance adjuster,
    wherein the controller is configured to determine at least one of the plurality of batteries included in the first battery group as a first balancing target based on the first voltage signal,
    wherein the first selector is configured to electrically connect the first balancing target between the first node and the second node,
    wherein the controller is further configured to control the resistance adjuster based on a first voltage difference between a voltage of the first balancing target and a reference voltage,
    wherein the battery balancing apparatus includes a smaller number of resistors, including the first resistor and the second resistor, than a number of the plurality of batteries, and
    wherein the first selector includes:
        a first switching circuit including a plurality of switches, each of the plurality of switches of the first switching circuit of the first selector having a first end connected to a positive terminal of each of the plurality of batteries and a second end connected to the first node; and
        a second switching circuit including a plurality of switches, each of the plurality of switches of the second switching circuit of the first selector having a first end connected to a negative terminal of each of the plurality of batteries and a second end connected to the second node.

2. The battery balancing apparatus according to claim 1, wherein a first end of the first resistor is electrically connected to the first node,
    wherein a first end of the second resistor is electrically connected to the second node, and
    wherein the resistance adjuster includes:
        a first switch connected between a second end of the first resistor and the second node; and
        a second switch connected between a second end of the second resistor and the first node.

3. The battery balancing apparatus according to claim 2, wherein a resistance of the first resistor is higher than a resistance of the second resistor, and
    wherein the controller is further configured to turn on the first switch and turn off the second switch so that the first resistor is electrically connected between the first node and the second node, when the first voltage difference is equal to or larger than a first threshold voltage and smaller than a second threshold voltage.

4. The battery balancing apparatus according to claim 2, wherein a resistance of the first resistor is higher than a resistance of the second resistor, and
    wherein the controller is further configured to turn off the first switch and turn on the second switch so that the second resistor is electrically connected between the first node and the second node, when the first voltage difference is equal to or larger than a second threshold voltage and smaller than a third threshold voltage.

5. The battery balancing apparatus according to claim 2, wherein the controller is further configured to turn on the first switch and turn on the second switch so that the parallel circuit is electrically connected between the first node and the second node, when the first voltage difference is equal to or larger than a third threshold voltage.

6. The battery balancing apparatus according to claim 2, wherein the resistance adjuster further includes:
    a third switch connected between the second end of the first resistor and the second end of the second resistor, and
    wherein the controller is further configured to turn off the first switch and turn off the second switch and turn on the third switch so that the series circuit is electrically connected between the first node and the second node, when the first voltage difference is smaller than a first threshold voltage.

7. The battery balancing apparatus according to claim 1, wherein a first end of the first resistor is electrically connected to the first node, and
    wherein the resistance adjuster includes:
        a first switch connected between a second end of the first resistor and the second node;
        a second switch connected between a first end of the second resistor and the second node; and
        a third switch connected between a second end of the second resistor and the first node.

8. The battery balancing apparatus according to claim 7, wherein a resistance of the first resistor is higher than a resistance of the second resistor, and
    wherein the controller is further configured to turn on the first switch and turn off at least one of the second switch and the third switch so that the first resistor is electrically connected between the first node and the second node, when the first voltage difference is equal to or larger than a first threshold voltage and smaller than a second threshold voltage.

9. The battery balancing apparatus according to claim 8, wherein the resistance of the first resistor is higher than the resistance of the second resistor, and
wherein the controller is further configured to turn on the second switch and turn on the third switch and turn off the first switch so that the second resistor is electrically connected between the first node and the second node, when the first voltage difference is equal to or larger than the second threshold voltage and smaller than a third threshold voltage.

10. The battery balancing apparatus according to claim 9, wherein the controller is configured to turn on the first switch, turn on the second switch and turn on the third switch so that the parallel circuit is electrically connected between the first node and the second node, when the first voltage difference is equal to or larger than the third threshold voltage.

11. A battery balancing apparatus, comprising:
a detector configured to output a first voltage signal indicating voltage of each of a plurality of batteries included in a first battery group;
a first selector configured to selectively electrically connect each of the plurality of batteries included in the first battery group between a first node and a second node;
a resistance adjuster configured to selectively electrically connect a first resistor, a second resistor, a series circuit of the first resistor and the second resistor or a parallel circuit of the first resistor and the second resistor between the first node and the second node;
a second selector configured to selectively electrically connect each of a plurality of batteries included in a second battery group between a third node and a fourth node; and
a controller operably coupled to the detector, the first selector, the resistance adjuster, and the second selector,
wherein the controller is configured to determine at least one of the plurality of batteries included in the first battery group as a first balancing target based on the first voltage signal,
wherein the first selector is configured to electrically connect the first balancing target between the first node and the second node,
wherein the controller is further configured to control the resistance adjuster based on a first voltage difference between a voltage of the first balancing target and a reference voltage,
wherein the battery balancing apparatus includes a smaller number of resistors, including the first resistor and the second resistor, than a number of the plurality of batteries,
wherein the detector is further configured to output a second voltage signal indicating voltage of each of the plurality of batteries included in the second battery group,
wherein the resistance adjuster is further configured to selectively electrically connect the first resistor, the second resistor, the parallel circuit or the series circuit between the third node and the fourth node,
wherein the controller is further configured to determine at least one of the plurality of batteries included in the second battery group as a second balancing target based on the second voltage signal,
wherein the second selector is further configured to electrically connect the second balancing target between the third node and the fourth node, and
wherein the second selector includes:
a first switching circuit including a plurality of switches, each of the plurality of switches of the first switching circuit of the second selector having a first end connected to a positive terminal of each of the plurality of batteries and a second end connected to the first node; and
a second switching circuit including a plurality of switches, each of the plurality of switches of the second switching circuit of the second selector having a first end connected to a negative terminal of each of the plurality of batteries and a second end connected to the second node.

12. The battery balancing apparatus according to claim 11, wherein a first end of the first resistor is electrically connected to the first node,
wherein a first end of the second resistor is electrically connected to the third node, and
wherein the resistance adjuster includes:
a first switch connected between a second end of the first resistor and the second node;
a second switch connected between a second end of the second resistor and the fourth node;
a third switch connected between the first node and the third node;
a fourth switch connected between the second end of the second resistor and the second node;
a fifth switch connected between the second end of the first resistor and the third node; and
a sixth switch connected between the first node and the fourth node.

13. The battery balancing apparatus according to claim 12, wherein the controller is further configured to turn on the fourth switch and the fifth switch and turn off the first switch, the second switch, the third switch and the sixth switch so that the series circuit is electrically connected between the first node and the second node, when the voltage of the first balancing target is higher than a voltage of the second balancing target and a second voltage difference between the first balancing target and the second balancing target is smaller than a fourth threshold voltage.

14. The battery balancing apparatus according to claim 12, wherein the controller is further configured to turn on the first switch, the fourth switch and the sixth switch and turn off the second switch, the third switch and the fifth switch so that the series circuit is electrically connected between the third node and the fourth node, when a voltage of the second balancing target is higher than a voltage of the first balancing target and a second voltage difference between the first balancing target and the second balancing target is smaller than a fourth threshold voltage.

15. A battery pack comprising the battery balancing apparatus according to claim 1.

16. A battery pack comprising the battery balancing apparatus according to claim 11.

* * * * *